(12) United States Patent
Nechvatal

(10) Patent No.: US 6,883,502 B2
(45) Date of Patent: Apr. 26, 2005

(54) FLUID/LIQUID HEAT EXCHANGER WITH VARIABLE PITCH LIQUID PASSAGEWAYS AND ENGINE SYSTEM USING SAME

(75) Inventor: Samuel C. Nechvatal, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/462,159

(22) Filed: Jun. 16, 2003

(65) Prior Publication Data

US 2004/0250800 A1 Dec. 16, 2004

(51) Int. Cl.[7] .......................... F02B 33/00; F02B 29/04
(52) U.S. Cl. ..................... 123/563; 60/599; 165/146; 165/166
(58) Field of Search .................... 123/536; 60/599; 165/166, 146, 147, 80.4

(56) References Cited

U.S. PATENT DOCUMENTS

| | | | |
|---|---|---|---|
| 2,646,027 A | 7/1953 | Acherman et al. | 123/563 |
| 3,881,455 A | 5/1975 | Belsanti | |
| 4,191,148 A | 3/1980 | Patel et al. | |
| 4,201,263 A * | 5/1980 | Anderson | 165/166 |
| 4,347,895 A | 9/1982 | Zambrow | |
| 4,428,418 A | 1/1984 | Beasley et al. | |
| 4,474,162 A * | 10/1984 | Mason | 123/563 |
| 4,651,816 A | 3/1987 | Struss et al. | 165/140 |
| 4,805,693 A | 2/1989 | Flessate | |
| 4,949,544 A | 8/1990 | Hines | |
| 5,036,668 A * | 8/1991 | Hardy | 123/563 |
| 5,046,481 A | 9/1991 | Warwick | |
| 5,097,891 A | 3/1992 | Christensen | |
| 5,183,106 A | 2/1993 | Stancliffe et al. | 165/166 |
| 5,228,512 A | 7/1993 | Bretl et al. | |
| 5,303,770 A | 4/1994 | Dierbeck | |
| 5,490,559 A | 2/1996 | Dinulescu | 165/148 |
| 5,526,873 A | 6/1996 | Marsais et al. | 165/51 |
| 6,267,176 B1 | 7/2001 | Bolla et al. | |
| 6,374,911 B1 | 4/2002 | Olson et al. | |
| 6,394,076 B1 | 5/2002 | Hudelson | |
| 2002/0005278 A1 | 1/2002 | Ozaki et al. | |
| 2002/0011242 A1 | 1/2002 | Ruppel et al. | 123/563 |
| 2002/0023734 A1 | 2/2002 | Wagner | 165/81 |

FOREIGN PATENT DOCUMENTS

| | | | | |
|---|---|---|---|---|
| DE | 23 42 787 A1 | 8/1973 | | F02B/29/04 |
| JP | 57005514 A | * 1/1982 | | F02B/29/04 |
| JP | 61086595 A | * 5/1986 | | 165/166 |

* cited by examiner

Primary Examiner—Thai-Ba Trieu
(74) Attorney, Agent, or Firm—Liell & McNeil

(57) ABSTRACT

Engineers have learned that if the temperature of coolant within a heat exchanger is raised above the coolant's boiling point by the entering hot fluid, the boiling of the coolant can cause corrosion within the heat exchanger. The heat exchanger of the present invention includes a heat exchanger body that defines a plurality of fluid passages that are operable to exchange heat with a plurality of liquid passages. At least one of the liquid passages is re-sized to include a greater cross-sectional flow area than another liquid passage. Thus, a greater amount of liquid can flow through the coolant passage with the greater cross-sectional flow area, thereby reducing the risk of boiling coolant that may cause corrosion within the coolant passage.

20 Claims, 2 Drawing Sheets

FLUID/LIQUID HEAT EXCHANGER WITH VARIABLE PITCH LIQUID PASSAGEWAYS AND ENGINE SYSTEM USING SAME

TECHNICAL FIELD

The present invention relates generally to fluid/liquid heat exchangers, and more specifically to a charge air cooler for an internal combustion engine system and a method of sizing at least one liquid passage within a heat exchanger to avoid corrosion.

BACKGROUND

There are various uses for heat exchangers known in the art. For instance, heat exchangers, referred to as charge air coolers, use a coolant, such as water, to cool compressed air exiting a turbocharger before the air is moved into an engine cylinder. The compressed air flowing from the turbocharger can reach high temperatures. For example, it is not uncommon for the compressed air exiting the turbocharger to reach 240° C. Due to the high temperature, the compressed air has a lower density, and thus, less oxygen than an identical volume of colder compressed air. In order to increase the air density, and thus the amount of oxygen that can be burned within the engine, the hot compressed air will flow through air passages within the charge air cooler. The heat within the air can be exchanged with coolant flowing through coolant passages adjacent, and often perpendicular, to the air passages within the charge air cooler. Therefore, the coolant will increase in temperature and the air will decrease in temperature as the coolant and air simultaneously pass through the charge air cooler.

Although the charge air coolers used in conjunction with turbochargers do cool the compressed air prior to entering the engine, the heat exchange between the air and the coolant can sometimes result in corrosion within the coolant passages of the charge air cooler. Often, the corrosion occurs in the coolant passages nearest the hot air inlet because the air within the charge air cooler is at its highest temperature when entering the charge air cooler. The hot compressed air can boil the coolant, and the boiling coolant can erode the metal around the coolant passages. Eventually, the boiling coolant can create a hole between the coolant and air passages, allowing leakage between the two. This leakage can undesirably cause coolant to enter an engine cylinder.

It is foreseeable that the risk of corrosion within the liquid passages will increase as the capabilities of turbochargers improve. Engineers are continually attempting to increase engine power by improving the air compression capability of turbochargers. However, increased compression results in increased temperature of the exiting compressed air. For instance, it is foreseeable that turbochargers will soon be producing compressed air at 300° C. The increased temperature of the compressed air may not only cause coolant to boil within the coolant passage adjacent to the hot air inlet, but may be sufficient to cause the coolant within the coolant passages farther away from the hot air inlet to also boil.

Engineers have attempted to reduce corrosion within heat exchangers by various methods. For instance, a charge air cooler described in published U.S. Patent Application No. 2002/0011242 A1, includes multiple heat exchanger blocks. A first heat exchanger block is included within a different coolant circuit than a second heat exchanger block. The first heat exchanger block uses a higher temperature coolant and a more erosive resistant and temperature stable material than the second heat exchanger block. Thus, the first heat exchanger block acts as a pre-cooler of the compressed hot air prior to its entry into the second heat exchanger block. Although the described charge air cooler may reduce the amount of corrosion caused by boiling coolant, manufacturing the charge air cooler may be expensive and burdensome. For instance, the higher temperature coolant and the corrosion resistant material may increase the costs of manufacturing and operating the charge air cooler, and may require two separate coolant systems. In addition, using two heat exchanger blocks may increase the size of the charge air cooler such that it consumes valuable space in a chassis.

The present invention is directed at overcoming one or more of the problems set forth above.

SUMMARY OF THE INVENTION

In one aspect of the present invention, a fluid/liquid heat exchanger includes a heat exchanger body defining a plurality of fluid passages and a plurality of liquid passages. The fluid passages are operable to exchange heat with the liquid passages. An initial one of the liquid passages has a cross-sectional flow area greater than another liquid passage.

In another aspect of the present invention, an engine system includes an engine and a turbocharger. An air inlet of the engine is in fluid communication with an air line in fluid communication with the turbocharger. A charge air cooler is also in fluid communication with the air line and includes a charge air cooler body defining a plurality of air passages and a plurality of liquid passages. The air passages are operable to exchange heat with the liquid passages. An initial one of the liquid passages has cross-sectional flow area greater than another liquid passage.

In yet another aspect of the present invention, there is a method of re-sizing one of a plurality of liquid passages in a fluid/liquid heat exchanger. After sizing the passage, it is determined whether liquid flowing through the liquid passage of the plurality of identical liquid passages will boil. If the liquid will boil, the cross-sectional area of the at least one liquid passage is enlarged.

DETAILED DESCRIPTION

Figure 1:
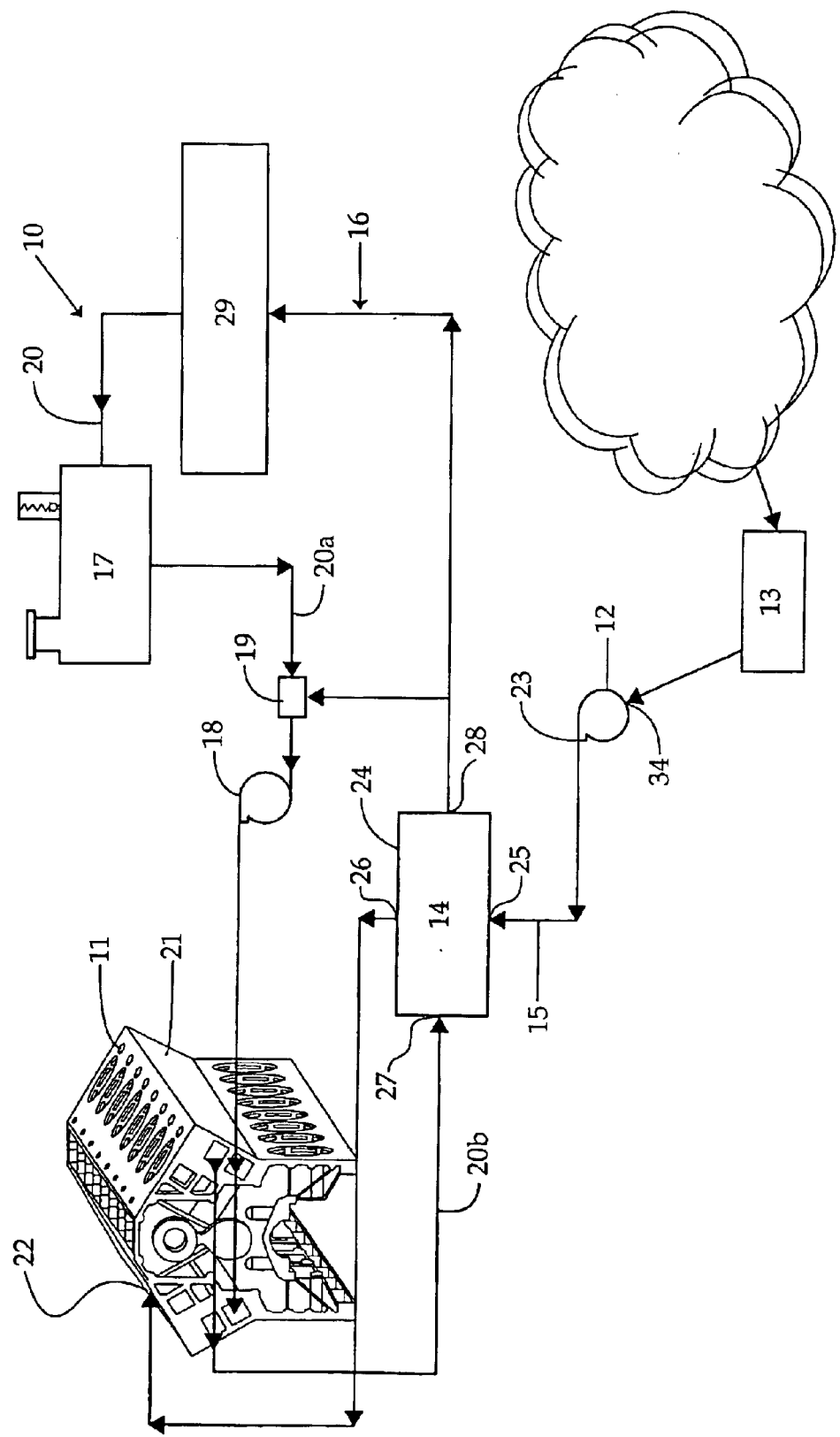
FIG. 1 is a schematic representation of an engine system, according to the present invention.
Figure 2:
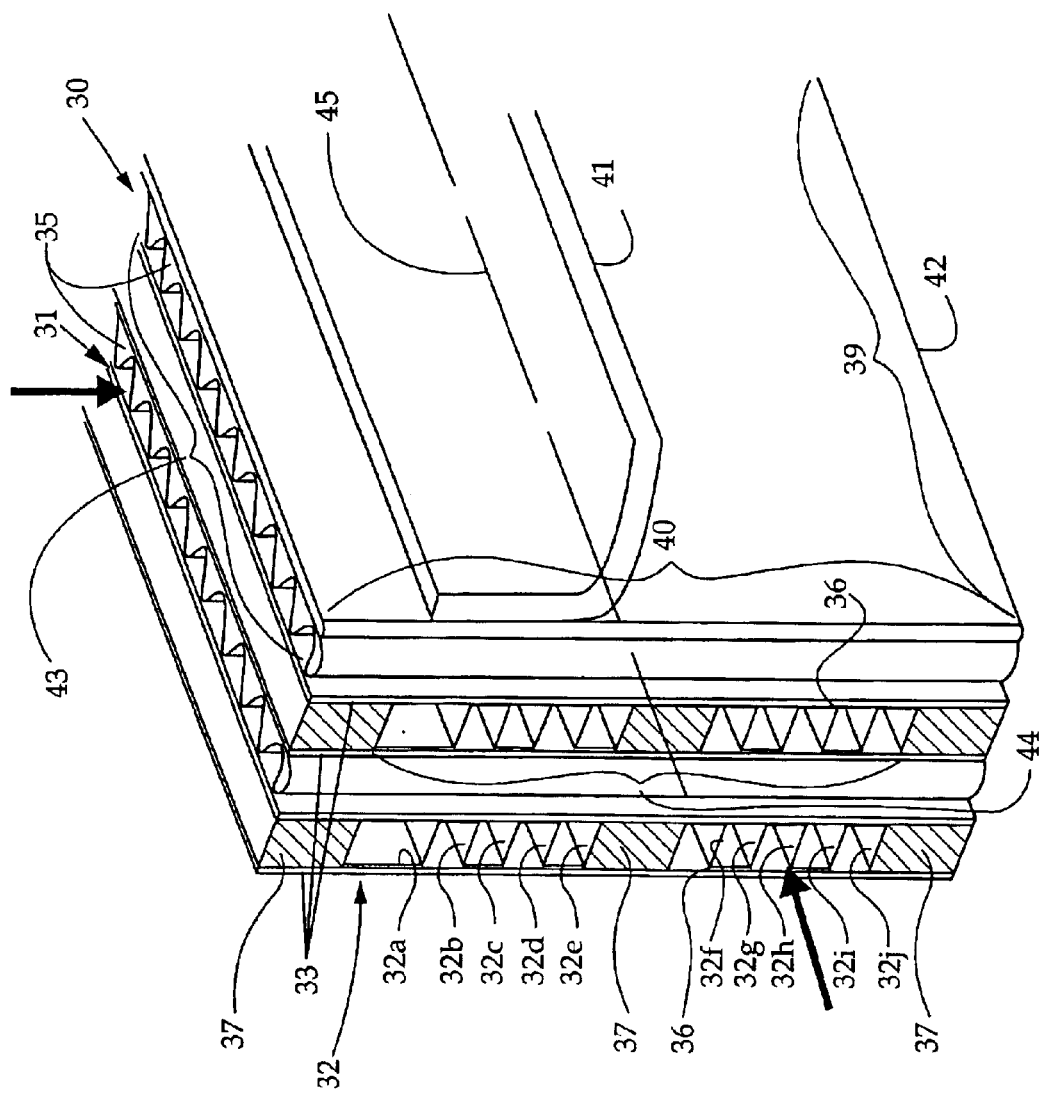
FIG. 2 is a partial isometric diagrammatic representation of a core within the charge air cooler that is included in the engine system of FIG. 1.

Referring to FIG. 1, there is shown a schematic representation of an internal combustion engine system 10, according to the present invention. The engine system 10 includes an engine 11 that includes an engine housing 21 defining an air inlet 22. The engine system 10 also includes a turbocharger 12 that includes an air outlet 23 fluidly connected to the air inlet 22 of the engine 11 via an air line 15. The turbocharger 12 draws ambient air through an air filter 13 and into an air inlet 34 of the turbocharger 12. Within the turbocharger, the air is compressed and then delivered to the engine 10 via the air line 15. A charge air cooler 14 is positioned within the air line 15 between the air outlet 23 of the turbocharger 12 and the air inlet 22 of the engine 11. The temperature of the compressed air exiting the turbocharger 12 is significantly increased due to the compression within the turbocharger 12. Thus, the charge air cooler 14 will cool the compressed air before it is moved into the engine 11. By cooling the compressed air, the density, and thus the oxygen content, of the air is increased. The exhaust created by the combustion within the engine 11 will continue to power the turbocharger 12, and the process can continuously sustain itself The charge air cooler 14 includes a charge air cooler body 24 that defines a relatively hot air inlet 25, a relatively cool air outlet 26, a coolant inlet 27 and a coolant outlet 28. A core 30 (shown in FIG. 2) is positioned within a space defined by the charge air cooler body 24. As shown in FIG. 2, the core 30 includes a core body 42 that defines a plurality of air passages 31 and a plurality of coolant passages 32. Although not shown, the core body 42 and the charge air cooler body 24 define an air inlet manifold, an air outlet manifold, a coolant inlet manifold and a coolant outlet manifold that direct air and coolant streams into and out of the core 30. The air passages 31 are in fluid communication with the relatively hot air inlet 25 and the relatively cool air outlet 26 via the air inlet manifold and the air outlet manifold, respectively. Further, the coolant passages 32 are in fluid communication with the coolant inlet 27 and the coolant outlet 28 via the coolant inlet manifold and the coolant outlet manifold, respectively.

Still referring to FIG. 1, in addition to being positioned within the air line 15, the charge air cooler 14 is positioned within a coolant circulation system 16. Although water is often used as the coolant within charge air coolers, the present invention contemplates use of various types of liquid coolants. A coolant pump 18 draws coolant from a source of coolant 17, preferably an expansion tank of the type known in the art, and delivers the coolant to the engine 11 via a coolant line 20. A thermostat 19 is positioned within the upstream portion 20a of the coolant line 20. As the coolant flows through the engine 11, the coolant will absorb the heat from the moving parts of the engine 11 in order to prevent the engine 11 from overheating. Thus, the coolant leaving the engine 11 will be at a higher temperature than the coolant entering the engine 11. The coolant will flow from the engine 11 to the charge air cooler 14 via a downstream portion 20b of the coolant line 20. As the coolant flows through the plurality of coolant passages 32, the coolant can absorb the heat of the hot compressed air flowing through the plurality of air passages 31 oriented perpendicular to the coolant passages 32 within the charge air cooler 14 (shown in FIG. 2). Those skilled in the art will appreciate that the coolant should be able to absorb both the heat of the moving engine components and the heat of the compressed air without boiling. The two could also be on separate cooling circuits. Once the coolant exits the charge air cooler 14 via the coolant outlet 28, the coolant is circulated to a second heat exchanger, such as a radiator 29, via the downstream portion 20b of the coolant line 20. As the coolant passes through the radiator 29, the heat from the coolant can be transferred to relatively cool air passing through the radiator 29. Thus, the increased temperature of the coolant caused by the moving engine components and the compressed hot air can be decreased. The radiator 29 is fluidly connected to the source of coolant 17 so that the coolant can be recirculated through the coolant circuit 16.

Although the fluid/liquid heat exchanger of the present invention is described as the charge air cooler 14 that transfers heat from compressed air exiting from the turbocharger 12 to the coolant circulation system 16, it should be appreciated the present invention contemplates use within various types of fluid/liquid heat exchangers that may or may not be used in conjunction with an engine.

Referring to FIG. 2, there is shown a partial isometric diagrammatic representation of the core 30 positioned within the charge air cooler 14 of the engine system 10 of FIG. 1. Although the core 30 is preferably a "bar and plate" style core 30, it should be appreciated that the present invention also contemplates the charge air cooler including a "tube and fin" style core of the type known in the art. For instance, if the present invention were applied to the tube and flange style core, the cross-sectional area of an initial tube that serves as a coolant passage would be enlarged. As illustrated in FIG. 2, the core body 24 includes a flange 41 used to attach and secure the core body 42 to the charge air cooler body 24. The core body 42 also includes multiple separator sheets 33, air fins 35 and coolant fins 36, although the present invention contemplates a charge air cooler including only one separator sheet positioned between an air fin and a coolant fin. The separator sheets 33 are preferably alternatively separated from one another by the air fins 35 and the coolant fins 36 in order to maintain the air flow separate from the coolant flow. Although the present invention contemplates charge air coolers of various sizes including various numbers of stacked separator sheets 33 positioned between air fins 31 and coolant fins 32, the present invention is illustrated as including three separator sheets 33, each positioned between one of the air fins 35 and one of the coolant fins 36. Further, the core body 24 includes enclosure bars 37 that act as end surfaces for each coolant fin 36 and provide a surface for attaching the manifolds to the core body 42. As illustrated, although not necessary, center support bars can also be positioned along a center line 45 of the core 30 to provide additional support. It should be appreciated that each center support bar could separate each coolant fin 36 into two sections. Although each coolant fin 36 may include two separate sections, for purposes of this discussion, the two separate sections will be considered one coolant fin 36. The separate components of the core 30 can be made into one unit by various methods known in the art, such as brazing the assembled core.

Each coolant fin 36 defines a group of coolant passages 44. Because there are two identical coolant fins 36 in the illustrated example, there are two identical groups of coolant passages 44. Each group of coolant passages 44 is separated into coolant passages 32a–j by the coolant fin 36. Each coolant fin 36 preferably includes sheet metal bent to include alternative grooves with rectangular cross sections. These alternative grooves serve as the coolant passages 32a–j while also providing support to the charge air cooler structure. The plurality of air fins 35 is similarly divided into groups of air passages 43, with each group 43 being defined by each air fin 35. Because the two air fins 35 are identical, they define two identical groups of air passages 43. Each air fin 35 separates each of the air passages within the group 43 from one another. Each air fin 35 includes sheet metal bent into a wave pattern to include alternative grooves that serve as the air passages 31. However, the air fins 35 include a serpentine shape. The air fins 35 are oriented perpendicular to the coolant fins 36, and segments of the coolant fin 36 are oriented also parallel with the separator sheets 33, but perpendicular to the air fins 35. Thus, the air fins 35 direct the air flow along a path parallel with the separator sheets 33, and the coolant fins 36 direct the coolant flow along a path also parallel to the separator sheets 33, but perpendicular to the air fins 35. The flow of air through the plurality of air passages 31 is illustrated by the vertical arrow, and the flow of coolant through the plurality of coolant passages 32 is illustrated by the horizontal arrow.

The core 30 has a height 40 and a length 39. Each coolant fin 36 extends along the height 40 of the core 30 so that the coolant passages 32a–j within each group 44 are stacked on one another along the height 40; whereas, each air fin 35 extends along the length 39 of the core 30 so that the air passages within each group 43 are stacked on one another along the length 39. Although each coolant fin 36 separates the height 40 of the core 30 into ten coolant passages 32a–j, it should be appreciated that the coolant fin 36 could be bent to separate the height 40 into any number of coolant passages. Methods of determining the number of coolant passages for a specific charge air cooler are known in the art. Those skilled in the art will appreciate that an increased number of coolant passages within the height 40 will result in passages with smaller flow areas that may increase heat transfer between the coolant and air. However, an increased number of coolant passages may also increase the risk of heating the coolant to a boil, which can cause decreased heat transfer efficiency and increased corrosion. Further, an increased number of passages within the height 40 will create more flow resistance against which the coolant pump 18 must operate. Similarly, although the present invention is illustrated with each air fin 35 separating the length of the core 30 into at least fourteen air passages, those skilled in the art should appreciate that the present invention contemplates each air fin separating the length into any number of air passages. Preferably, the cross sectional flow areas of the air passages 31 are identical to one another. Similar to the number of coolant passages, methods of determining the desired number of air passages are known in the art, and include some of the same considerations as the method of determining the number of coolant passages.

Because the groups of coolant passages 44 are often initially designed to be identical to one another, the description of the coolant passages 32a–j similarly applies to each group 44. Coolant passage 32a is illustrated as the initial coolant passage to the relatively hot air inlet 25 (shown in FIG. 1) in which the hot compressed air from the turbocharger 12 enters the charge air cooler 14, and coolant passage 32j is illustrated as the closest coolant passage to the relatively cool air outlet 26 (shown in FIG. 1) from which the cooled compressed air exits the charge air cooler 14. The plurality of coolant passages 32 preferably includes a uniform length and a uniform width. However, at least one of the coolant passages of each group 44 includes a cross-sectional flow area greater than a majority of the other coolant passages. Although the greater cross-sectional flow area can be caused by increasing the size of the coolant passage in various directions, the pitch of the coolant passage 32a is preferably enlarged. For purposes of this discussion, pitch is a wavelength of each groove included within the coolant fin 36. Coolant passage 32a includes the enlarged pitch than the other coolant passages 32b–j. It should be appreciated that although the present invention illustrates only one coolant passage 32a with the enlarged pitch, the present invention contemplates any number of coolant passages with the enlarged pitch. Further, although the present invention illustrates coolant passages 32b–j including the identical smaller pitch, the pitch could vary among the coolant passages 32b–j as long as each pitch is equal to or less than the pitch of it's adjacent coolant passage closer to the hot air inlet 25. In fact, each coolant passage 32a–j might decrease sequentially in pitch with distance from the hot air inlet 25.

The coolant passage 32a preferably includes the greater cross-sectional flow area because of its initial position adjacent to the relatively hot air inlet 25 of the charge air cooler 14. Because the compressed air entering the charge air cooler 14 is at its highest temperature near the hot air inlet 25, the coolant adjacent to the highest temperature air absorbs the greatest heat transfer load from the air. Due to the greater cross-sectional flow area of coolant passage 32a, more coolant will be able to flow through the coolant passage 32a in order to absorb more heat from the relatively hot air that is entering the inlet 25. Because the heat transfer load between the air and the coolant within the coolant passages 32b–j decreases with distance from the hot air inlet 25, the amount of coolant needed to absorb the heat from the air is reduced. Thus, in a more sophisticated version of the present invention, the pitch of the coolant passages 32b–j might decrease stepwise with distance from the relatively hot air inlet 25.

INDUSTRIAL APPLICABILITY

Referring to FIGS. 1 and 2, a method of sizing coolant passage 32a of each group of coolant passages 44 will be described for the charge air cooler 14. It should be appreciated that the same method of sizing coolant passage 32a can be applied to re-size any of the other coolant passages 32b–j. It should also be appreciated that the method of independently re-sizing each passage 32a–j can be applied to other types of fluid/liquid heat exchangers. Further, the method of sizing can be applied to reduce the boiling, and thus corrosion, within an existing charge air cooler and/or to avoid boiling, and thus corrosion, within a newly designed charge air cooler. Therefore, the present invention contemplates a coolant passage of the existing charge air cooler being re-sized and/or a new charge air cooler being designed to include an initial coolant passage with a greater cross-sectional area than a majority of the other coolant passages. If the charge air cooler 14 is being designed new, the charge air cooler 14 will often be predetermined to include a plurality of identically sized coolant passages. If the coolant passage to be re-sized is included within an existing charge air cooler 14, the coolant passage will generally include an identical cross-sectional flow area as the other coolant passages. Those skilled in the art will recognize that existing charge air coolers may include a coolant passage with a smaller cross-sectional area that is positioned adjacent to the cool air inlet when the height of the core cannot be evenly separated into the desired number of coolant passages. This smaller, coincidental coolant passage is different from enlarging of one of the coolant passages in order to avoid boiling.

The number and size of identical coolant passages within the charge air cooler 14 can be determined by methods known in the art. Those skilled in the art will appreciate that the number and size of the identical coolant passages is one of a variety of factors that can contribute to the desired temperature drop within the compressed air passing through the charge air cooler 14. Those skilled in the art will also appreciate that there is a limit to the contribution that an increase number and/or decreased size of the identical coolant passages can make towards the desired temperature drop within the compressed air.

In order to re-size at least one coolant passage within the plurality 32, the coolant passage(s) in which boiling may occur must be identified. The coolant passage(s) that need to be enlarged in order to avoid boiling coolant can be identified by experimentation and/or actual use. Because the coolant passing through the initial coolant passage 32a must absorb the greatest heat transfer load due to the position of the passage 32a adjacent to the relatively hot air inlet 25, coolant passage 32a is preferably the first, and possibly only, coolant passage of the identical coolant passages in need of being enlarged. However, because the present invention contemplates enlarging any of the coolant passages 32a–j to avoid boiling caused by reasons other than being adjacent to the relatively hot air inlet 25, actual use, modeling, and/or experimentation may reveal a passage 32$bj$ other than passage 32$a$ in which boiling is occurring.

Once it is determined which coolant passage is to be re-sized, the cross-sectional flow area of the coolant passage is enlarged. In the preferred embodiment, the cross-sectional flow area of coolant passage 32$a$ is enlarged. The cross-sectional area needed to accommodate a sufficient amount of liquid that can absorb the heat transfer load between the air and the coolant flowing through coolant passage 32$a$ might be calculated. The enlarged cross-sectional flow area can be determined experimentally, mathematically, or through a combination of both methods. In order to experimentally determine the enlarged cross-sectional flow area, engineers can choose a cross-sectional flow area based on an estimated heat transfer load and prior experience. For purposes of the description of the present invention, "heat transfer load" refers to the energy being transferred between the air and the coolant. It should be appreciated that the heat transfer load between the air and the coolant within coolant passage 32$a$ can be estimated through experimentation or calculations known in the art.

The coolant can then be pumped through the coolant passage 32$a$ while the relatively hot air from the turbocharger 12 is being passed through the air passages 31. If the coolant boils in coolant passage 32$a$, the cross-sectional flow area of the coolant passage 32$a$ should be increased. Although the present invention contemplates the cross-sectional flow area being enlarged by various methods, including but not limited to, increasing the width of the coolant passage 32$a$, the cross-sectional flow area of coolant passage 32$a$ is preferably increased by increasing the pitch of coolant passage 32$a$. Thus, the cross-sectional flow area of the coolant passage 32$a$ can be enlarged without re-structuring the core 30 to include a larger length or increasing the spacing between the separating sheets 33. In order to determine the cross-sectional flow area of one of the other coolant passages 32$b$–$j$, a similar trial and error experimental process as the one described above can be used. The farther away from the relatively hot air inlet 27 the coolant passage 32$b$–$j$ is, the smaller the cross-sectional area may be without causing the water to boil within the specific passages 32$b$–$j$.

In order to calculate the enlarged cross-sectional flow area of the coolant passage 32$a$, a volumetric flow rate (Q flow) of the coolant through the coolant passage 32$a$ required to absorb the heat transfer load (Q) without causing the coolant to boil is determined. In the illustrated example of the present invention, the product of the specific heat of the coolant ($c_p$) and the temperature change between the coolant entering and exiting the coolant passage 32$a$ is divided by the heat transfer load (Q) from the hot compressed air. It should be appreciated that the specific heat of the coolant at a known pressure and temperature is known in the art. The result is coolant mass flow rate (m) required to absorb the heat transfer load (Q) from the hot compressed air without causing the coolant to boil. The temperature (T in) of the coolant entering the charge air cooler 14 is either known or can be sensed via a temperature sensor positioned between a coolant outlet of the engine 11 and the coolant inlet 27 of the air cooler 14. The temperature (T out) of the coolant exiting the charge air cooler 14 can be any desired temperature less than the boiling point of the coolant. In order to maximize the heat transfer efficiency between the coolant and the air, the desired temperature (T out) of the coolant exiting the charge air cooler 14 can be as close to, without exceeding, the boiling point of the coolant. Those skilled in the art will appreciate that the volumetric flow rate (Q flow) is the coolant mass flow (m) divided by the density (p) of the coolant. The relevant equations are m=$c_p$ (T out−T in)/Q and Q flow=m/p.

Once the volumetric flow rate (Q flow) of the coolant through the coolant passage 32$a$ required to absorb the heat transfer load (Q) without the coolant boiling is determined, the cross-sectional flow area (A) of the coolant passage 32$a$ needed to accommodate the volumetric flow rate (Q flow) of the coolant through the passage 32$a$ can be determined by dividing the volumetric flow rate (Q flow) by an approximate coolant velocity (V). The approximate coolant velocity (V) through the coolant passage 32$a$ is a total flow through the core 30 divided by a total flow area of the core 30. The relevant equation is A=Q/V. Thus, the coolant passage 32$a$ can be re-sized to include the cross-sectional area (A) that is sufficient to accommodate the flow of coolant (Q flow) that can absorb the heat transfer load (Q) without the coolant boiling. The cross-sectional flow area of coolant passage 32$a$ will preferably be enlarged by increasing the pitch of the coolant passage 32$a$.

In order to fit coolant passages 32$b$–$j$, along with the coolant passage 32$a$ with the enlarged pitch, within the height 40 of the core 30, the cross-sectional flow areas of each coolant passage 32$b$–$j$ preferably will be reduced by an identical area by decreasing the pitch of each coolant passage 32$b$–$j$. However, it must be determined whether the coolant within each coolant passage 32$b$–$j$ with the reduced pitch will boil. Those skilled in the art will appreciate that the determination of whether boiling may occur within the passages 32$b$–$j$ can be made by the same methods described above for determining whether boiling would occur in coolant passage 32$a$. Generally, if the boiling occurs due to the reduced pitch, the boiling occurs in the initial passages with the reduced pitch closest to the relatively hot air inlet 25, such as coolant passage 32$b$. If it is determined that boiling may occur within passage 32$b$, the above method of re-sizing coolant passage 32$a$ can be repeated for coolant passage 32$b$. Thus, the pitch of coolant passage 32$b$ can be increased to accommodate more coolant that can absorb the heat transfer load without the coolant boiling. The pitch of coolant passages 32$c$–$j$ will again be decreased in order to fit the passages 32$a$–$j$ within the height 40 of the core 30. It can then be determined whether the further reduced size of coolant passage 32$c$ of each group 44 will cause the coolant to boil. If there may be boiling, the process can be repeated sequentially. Thus, the pitch of the coolant passages 32$b$–$j$ will either remain constant or decrease with distance from the relatively hot air inlet 25, but will generally not increase for reasons related to corrosion avoidance. In fact, the pitch of each coolant passage 32$a$–$j$ could decrease with distance from the inlet 24. If the boiling continues to be an issue with each reduced sized coolant passage, those skilled in the art will appreciate that the number of coolant passages within each group 44 may be decreased so that the coolant within each coolant passage does not boil.

The present invention is advantageous because it reduces corrosion within a heat exchanger, such as the charge air cooler 14, without compromising the overall heat exchange efficiency between the coolant and the compressed air. By increasing the cross-sectional area of the coolant passage[s [in which the coolant may boil, generally the initial coolant passage[s] closest to the hot air inlet 25, the present invention decreases the risk of boiling, and thus, corrosion. By decreasing the cross-sectional area of the coolant passages in which the heat transfer is insufficient to raise the coolant to its boiling point, generally the final coolant passages closest to the cool air outlet 26, the present invention increases the efficiency of the heat transfer between the coolant and the air. Therefore, the lack of efficiency caused by the greater cross-sectional area of the coolant passage(s) near the hot air inlet 25 that reduce the risk of corrosion can be compensated for by the increased efficiency of the smaller cross-sectional area of the coolant passage(s) near the cool air outlet 26. Thus, the present invention reduces the risk of corrosion within affecting the desired temperature decrease within the compressed air, without increasing the demands on the coolant pump 18, and without requiring a high-temperature coolant.

Further, the present invention is advantageous because it reduces the corrosion within the charge air cooler 14 without increasing the overall size of the charge air cooler 14. Therefore, the charge air cooler 14 of the present invention will not consume additional valuable space within a chassis of a vehicle. In addition, by decreasing the cross-sectional areas of the passages near the cool air outlet 26, the number of grooves defined by the coolant fins 36 may not need to be reduced. Therefore, the structural support provided by the coolant fins 36 is not compromised. Moreover, the charge air cooler 14 of the present invention is relatively inexpensive to manufacture being that no additional parts or materials are required. In addition, the method of re-sizing can be used to reduce corrosion in existing charge air coolers, or other types of heat exchangers.

It should be understood that the above description is intended for illustrative purposes only, and is not intended to limit the scope of the present invention in any way. Although the present invention has been illustrated in the context of a bar and plate type heat exchanger, the invention is applicable to other structures that permit enlargement of an initial liquid passage to avoid corrosion due to boiling. Thus, those skilled in the art will appreciate that other aspects, objects, and advantages of the invention can be obtained from a study of the drawings, the disclosure and the appended claims.

What is claimed is:

1. A method of cooling a fluid with a heat exchanger, comprising the steps of:
   dividing coolant liquid entering a liquid inlet of the heat exchanger among a plurality of liquid passages;
   dividing hot fluid entering a fluid inlet of the heat exchanger among a plurality of fluid passages;
   sequentially exchanging heat between the hot fluid and the coolant liquid at least in part by arranging the fluid passages so that fluid moving therein is sequentially adjacent different ones of the liquid passages, beginning with the initial liquid passage; and
   increasing a liquid flow through the initial liquid passage at least in part by sizing the initial liquid passage to have a larger flow area than an adjacent liquid passage.

2. A fluid/liquid heat exchanger comprising:
   a heat exchanger body defining a plurality of fluid passages connected at opposite ends to a fluid inlet manifold and fluid outlet manifold, respectively, and a plurality of liquid passages connected at opposite ends to a liquid inlet manifold and liquid outlet manifold, respectively, and the fluid passages being operable to exchange heat with the liquid passages; and
   an initial one of the liquid passages, which is adjacent the fluid inlet manifold, including a cross-sectional flow area greater than another liquid passage.

3. The fluid/liquid heat exchanger of claim 2 wherein the plurality of liquid passages have a uniform length.

4. The fluid/liquid heat exchanger of claim 2 wherein the initial liquid passage has a greater pitch than a majority of the other liquid passages.

5. The fluid/liquid heat exchanger of claim 2 wherein the heat exchanger body includes at least one separator sheet separating the liquid passages from the fluid passages; and
   at least one liquid fin separating the liquid passages from one another.

6. The fluid/liquid heat exchanger of claim 5 wherein the liquid fin includes sheet metal bent to include alternative grooves with rectangular cross sections.

7. The fluid/liquid heat exchanger of claim 6 wherein the heat exchanger body includes at least one fluid fin separating the fluid passages from one another; and
   the fluid fin being serpentine in shape and oriented perpendicular to the liquid fin.

8. The fluid/liquid heat exchanger of claim 7 wherein the heat exchanger body includes more than one separator sheet; and
   the separator sheets being planar, parallel to one another and alternatively separated by the liquid fin and the fluid fin.

9. The fluid/liquid heat exchanger of claim 8 wherein segments of the liquid fin being oriented perpendicular to the separator sheets.

10. The fluid/liquid heat exchanger of claim 2 wherein the heat exchanger body defines a relatively hot fluid inlet and a relatively cool fluid outlet being fluidly connected via the plurality of fluid passages; and
    the initial liquid passage being adjacent to the relatively hot fluid inlet.

11. The fluid/liquid heat exchanger of claim 10 wherein the plurality of liquid passages have a uniform length; and
    the liquid passage including the greater cross-sectional flow area includes a greater pitch than the other liquid passages.

12. The fluid/liquid heat exchanger of claim 2 wherein the fluid passages and the liquid passages are arranged such that fluid in the fluid passages is sequentially adjacent different ones of the liquid passages, beginning with the initial liquid passage.

13. An engine system comprising:
    an engine including an engine housing defining an air inlet connected to an air line;
    a turbocharger in fluid communication with the air line;
    a charge air cooler in fluid communication with the air line and including charge air cooler body defining a plurality of air passages and a plurality of liquid passages, the air passages being operable to exchange heat with the liquid passages, and an initial one of the liquid passages having a cross-sectional flow area greater than another liquid passage; and
    the air passages and the liquid passages are arranged such that air in the air passages is sequentially adjacent different ones of the liquid passages, beginning with the initial liquid passage.

14. The engine system of claim 13 wherein the plurality of liquid passages have a uniform length.

15. The engine system of claim 14 wherein the initial one of the liquid passages has greater pitch than a majority of the other liquid passages.

16. The engine system of claim 15 wherein the charge air cooler body includes at least one separator sheet separating the liquid passages from the air passages, and at least one liquid fin separating the liquid passages from one another.

17. The engine system of claim 16 wherein the liquid fin includes sheet metal bent to include alternative grooves with rectangular cross sections.

18. The engine system of claim 17 wherein the charge air cooler body includes at least one air fin separating each air passage from one another; and the air fin being serpentine in shape and oriented perpendicular to the liquid fin.

19. The engine system of claim 18 wherein the charge air cooler body includes more than one separator sheet; and the separator sheets being planar, parallel to one another, alternatively separated by the liquid fin and the air fin, and perpendicular to segments of the liquid fin.

20. The engine system of claim 19 wherein the charge air cooler body defines a relatively hot air inlet and a relatively cool air outlet being fluidly connected via the plurality of air passages; and the initial one of the liquid passages being adjacent to the relatively hot air inlet.

* * * * *